United States Patent
Gensewich et al.

(10) Patent No.: US 9,120,553 B2
(45) Date of Patent: Sep. 1, 2015

(54) PROCESS AND A HOLLOW BODY FOR PRODUCING A COMPONENT HAVING AT LEAST ONE HOLLOW PROFILE

(75) Inventors: Christian Gensewich, Nordenham (DE); Christian Tuemena, Stuhr (DE)

(73) Assignee: Premium AEROTEC GmbH, Augsburg (DE)

( * ) Notice: Subject to any disclaimer, the term of this patent is extended or adjusted under 35 U.S.C. 154(b) by 418 days.

(21) Appl. No.: 12/876,757

(22) Filed: Sep. 7, 2010

(65) Prior Publication Data
US 2011/0056624 A1    Mar. 10, 2011

(30) Foreign Application Priority Data

Sep. 8, 2009   (DE) .......................... 10 2009 040 528

(51) Int. Cl.
*B29C 65/00*   (2006.01)
*B32B 37/00*   (2006.01)
(Continued)

(52) U.S. Cl.
CPC ............... *B64C 1/064* (2013.01); *B29C 70/44* (2013.01); *B29C 70/543* (2013.01);
(Continued)

(58) Field of Classification Search
CPC ...... B29C 65/00; B29C 65/02; B29C 65/022; B29C 65/18; B29C 65/48; B29C 65/78; B29C 65/7802; B29C 65/7805; B29C 65/7808; B29C 65/7838; B29C 65/7847; B29C 65/785; B29C 66/001; B29C 66/00145; B29C 66/41; B29C 66/51; B29C 66/52; B29C 66/5227; B29C 66/52271; B29C 66/52272; B29C 66/52297; B29C 66/524; B29C 66/53; B29C 66/532; B29C 66/5324; B29C 66/536

USPC .......... 156/285–286, 382; 264/511, 526, 553, 264/571; 425/504, 546, 388, 405.1, 405.2
See application file for complete search history.

(56) References Cited

U.S. PATENT DOCUMENTS

| | | | | |
|---|---|---|---|---|
| 5,366,684 A | * | 11/1994 | Corneau, Jr. .................. | 264/510 |
| 6,458,309 B1 | * | 10/2002 | Allen et al. ................... | 264/319 |
| 2005/0161851 A1 | * | 7/2005 | Tachauer et al. ............. | 264/45.9 |
| 2007/0176327 A1 | * | 8/2007 | Petersson et al. ............. | 264/319 |
| 2009/0166921 A1 | | 7/2009 | Jacob et al. | |

FOREIGN PATENT DOCUMENTS

| | | |
|---|---|---|
| DE | 10 2006 031 335 A1 | 1/2008 |
| DE | 10 2008 054 540 A1 | 6/2010 |

(Continued)

OTHER PUBLICATIONS

German Office Action, dated Feb. 26, 2010 (3 pages).

(Continued)

*Primary Examiner* — Richard Crispino
*Assistant Examiner* — Matthew Hoover
(74) *Attorney, Agent, or Firm* — Crowell & Moring LLP

(57) ABSTRACT

A process for producing a hollow profiled component formed by joining at least two laminated component elements, includes the steps of laminating a first of the component elements with at least one indentation, arranging a preformed hollow body in the indentation, applying an adhesive agent to a surface area of the first component element next to the indentation, placing the first component element together with the hollow body on the second component element with the indentation facing the second component element and the surface area provided with the adhesive agent contacting the second component element, covering the two component elements with a non-rigid fluid-tight covering, the interior of the hollow body being sealed off from the interior of the covering and being fluidically connected with the ambient exterior environment, placing the covered component elements in a pressure chamber, and applying a vacuum to the interior of the covering.

6 Claims, 1 Drawing Sheet

(51) Int. Cl.
    *B32B 37/10*     (2006.01)
    *B64C 1/06*     (2006.01)
    *B29C 70/44*     (2006.01)
    *B29C 70/54*     (2006.01)
    *B29D 99/00*     (2010.01)
    *B64C 1/12*     (2006.01)
    *B29L 31/30*     (2006.01)
    *B64C 1/00*     (2006.01)

(52) U.S. Cl.
    CPC .............. *B29D 99/0014* (2013.01); *B64C 1/12* (2013.01); *B29L 2031/3082* (2013.01); *B64C 2001/0072* (2013.01); *Y02T 50/433* (2013.01); *Y10T 428/13* (2015.01)

(56) References Cited

FOREIGN PATENT DOCUMENTS

| | | |
|---|---|---|
| EP | 1 762 355 A1 | 3/2007 |
| EP | 1 800 842 A1 | 6/2007 |
| EP | 2 008 796 A1 | 12/2008 |
| WO | WO 2008/133748 A2 | 11/2008 |

OTHER PUBLICATIONS

European Search Report with English Translation dated Mar. 8, 2013 (three (3) pages).
German Search Report (one (1) page).

\* cited by examiner

Prior Art

PROCESS AND A HOLLOW BODY FOR PRODUCING A COMPONENT HAVING AT LEAST ONE HOLLOW PROFILE

BACKGROUND AND SUMMARY OF THE INVENTION

This application claims the priority of German patent document 10 2009 040 528.3, filed Sep. 8, 2009, the disclosure of which is expressly incorporated by reference herein.

The present invention relates to a method and apparatus for producing a component having at least one hollow profile.

When components are produced from laminated composite fiber materials, particularly composite carbon fiber materials, individual component elements are joined under pressure, and preferably also under the effect heat. In this process, the component elements are accommodated in a non-rigid and fluid-tight covering which, itself, is subjected to a vacuum. Air bubbles, which may be present in the laminate, are removed in this manner during the joining of the component elements, and the component elements are firmly joined simultaneously by the pressure exercised from the outside.

If, between them, the component elements to be joined form a hollow profile, before the joining of the component elements, a hollow body in the form of a hose is usually placed in the indentation that later forms the interior of the hollow profile. This hose has a fluidic connection which leads out of the fluid-tight covering that is later subjected to a vacuum, and is in a fluidic connection with the outer environment. As a result, the ambient pressure acting from the outside onto the component elements is also guided into the interior of the hollow profile to be formed, so that this hollow profile does not collapse during the production process.

The hoses used heretofore as hollow bodies pose the risk that, for non-circular hollow profiles such as trapezoidal hollow profiles, the hose will be overstretched in the area of the cross-sectional corners and will burst under the effect of the pressure difference between the vacuum existing in the interior of the fluid-tight covering and the excess pressure applied from the outside.

This situation is illustrated in FIG. 3, where a first component element 201 provided with an indentation 210 and a second component element 202 are joined such that the indentation 210 forms a hollow profile together with the second component element 202. A hollow body 203 formed of a hose, usually with a circular cross-section, is placed into the interior of the indentation 210 and thus into the interior of the formed hollow profile. In the area of the lower corners of the hollow profile formed by the indentation 210, this hose usually takes up the position indicated by a broken line. When the hose is pressurized, it will take up the cross-sectional shape indicated by the continuous lines in the same lower corners. Thus, the wall of the hose 203 will be overstretched in this area by a multiple, for example, by 300%. This reduces the wall thickness and raises the danger of a bursting of the hose-type hollow body.

Furthermore, it has been shown that, despite a considerable overstretching, the hose cannot completely penetrate into the corners, so that, in the areas marked 202' and 202" of the second laminated component element 202 and in the areas 201' and 201" of the first component element 201, which are situated opposite the areas 202' and 202", no pressure can be exerted on the freshly laminated wall of the two component elements 201, 202. This may lead to a waving of the individual laminate layers in the respective component element 201, 202 in these areas. Therefore, the stability of the respective component element 201, 202 may possibly be weakened in these areas.

Although it is known to increase the wall thicknesses of the wall forming the hollow profile in order to prevent a collapse or to place cores with a solid cross-section (thus, not as hollow bodies) in the hollow profile, these two approaches nevertheless result in an increased weight of the finished component, which is undesirable, particularly in aircraft construction.

It is therefore an object of present invention to provide a process of the above-mentioned type which reliably prevents a collapse of a hollow profile during production, and lowers the reject rate of the manufacturing process.

Furthermore, another object of the present invention is to provide a hollow body suitable for the implementing such a process, as well as a component produced according to this process.

These and other objects and advantages are achieved by the process according to the invention for producing a component having at least one hollow profile and consisting of at least two laminated component elements, which process has the following steps:

laminating at least a first of the two component elements while shaping out at least one indentation;

arranging a hollow body in the indentation;

applying an adhesive agent to at least one surface area of the first component element next to the indentation;

placing the first component element together with the hollow body on the second component element such that the indentation points to the second component element and the surface area provided with the adhesive agent comes in contact with the second component element;

covering the two component elements with a non-rigid fluid-tight cover, with the interior of the hollow body being sealed off with respect to the interior of the covering and being in a fluidic connection with the environment outside the covering;

placing the covered component elements in a pressure chamber and applying a vacuum to the interior of the covering;

wherein the hollow body is constructed as a preform.

The use of a hollow body constructed as a preform, and having a cross-section that approximates the hollow profile to be formed, ensures that little or no overstretching of the wall material of the hollow body takes place due to the pressure difference between the vacuum applied within the fluid-tight covering and the excess pressure acting from the outside. As a result, the risk of the tearing of the hollow-body wall is clearly reduced in comparison with the state of the art. In addition, the hollow body constructed as a preform can penetrate farther into the corners of the cross-section than in the case of the prior art, and there can also apply a pressure acting from the inside to the wall material of the first and the second laminated component element, which is opposed by the excess pressure acting from the outside. As a result, the wall areas of the component elements are also compressed in these corners of the cross-section, so that the laminating result is improved.

The pressure chamber is preferably constructed as a pressure chamber oven and, after or during the application of the vacuum, the component elements are heated to the interior of the covering. As a result of the heating, the production will be accelerated and a higher degree of stability of the entire component will be achieved.

The hollow body is preferably fixed in the indentation. This fixing facilitates the joining of the component elements and ensures a more precise production.

In a particularly preferred embodiment of the process, the hollow body is provided on its exterior side at least one location with an iron-containing metal element or a magnet, and the hollow body in the indentation is fixed by at least one magnet or metal element mounted on the exterior of the first component element or metal element. The latter cooperates with the metal elements or magnets of the hollow body. As a result, the hollow body will be fixed in a simple manner in the indentation later forming the interior of the hollow profile. After the production process, this fixation can be released by the removal of the magnet or metal element provided on the exterior, so that the hollow body can then easily be pulled out of the hollow profile.

In this case, it is particularly preferable for the hollow body to be equipped on its exterior side with an iron-containing metal band. The latter may be mounted on the hollow body, for example, on a hose having an especially shaped cross-section, already during the production of the hollow body.

The hollow body preferably has a hose-type construction. The hose-type hollow body can then be closed off in a fluid-tight manner at its ends either already during the production of the hollow body, or before placing the hollow body into the indentation during the production process of the component.

In a particularly preferred embodiment, the hollow body is constructed as a preform having exterior walls that are rigid or stiff at least in sections. This further development of the hollow body provides the hollow body with a defined cross-sectional contour already before the filling-in of the pressure fluid, which facilitates the correct placing of the hollow body into the indentation.

The process can be carried out particularly advantageously when the first component element forms a longitudinal frame or a section of a longitudinal frame of a fuselage construction, preferably of an aircraft, and when the second component element forms a fuselage skin or a section of a fuselage skin, preferably of an airplane. In the production of aircraft parts from composite materials, a high-strength and highly precise joining of component elements for forming components is required. Such a joint can be achieved, for example, by the process according to the invention. Also in the case of other hull constructions of, for example, static objects or other vehicles, such as land vehicles or watercraft, the process according to the invention can be used advantageously.

For carrying out a process according to the invention, the hollow body according to the invention, as the preform, has a fluid-tight construction, with at least one connection that is fluidically connected with the interior of the hollow body. Furthermore, the hollow body has exterior walls that are rigid or stiff at least in sections. As indicated above, the rigid or stiff exterior walls or exterior wall sections facilitate the correct placing of the hollow body into the indentation of the first component element, and the fluidic connection makes it possible either to pressurize the interior of the hollow body separately, or to expose it to the ambient pressure applied from the outside to the fluid-tight covering.

The cross-section of the hollow body preferably forms the basic shape of a triangle or a trapezoid with rounded corners or the shape of a closed omega provided with a base. However, arbitrary other cross-sectional shapes of the hollow body can also be implemented.

On its exterior side at least one location, the hollow body is preferably equipped with an iron-containing metal element or a magnet. This embodiment facilities the fixing of the hollow body in the indentation, already described in connection with the process according to the invention, by means of magnetic forces and the subsequent uncomplicated elimination of the forces fixing the hollow body in the formed hollow profile, so that the hollow body can be pulled out of the hollow profile without difficulty after the production has been completed.

The invention also relates to a component produced according to the process of the invention.

Other objects, advantages and novel features of the present invention will become apparent from the following detailed description of the invention when considered in conjunction with the accompanying drawings.

DETAILED DESCRIPTION OF THE DRAWINGS

Figure 1:
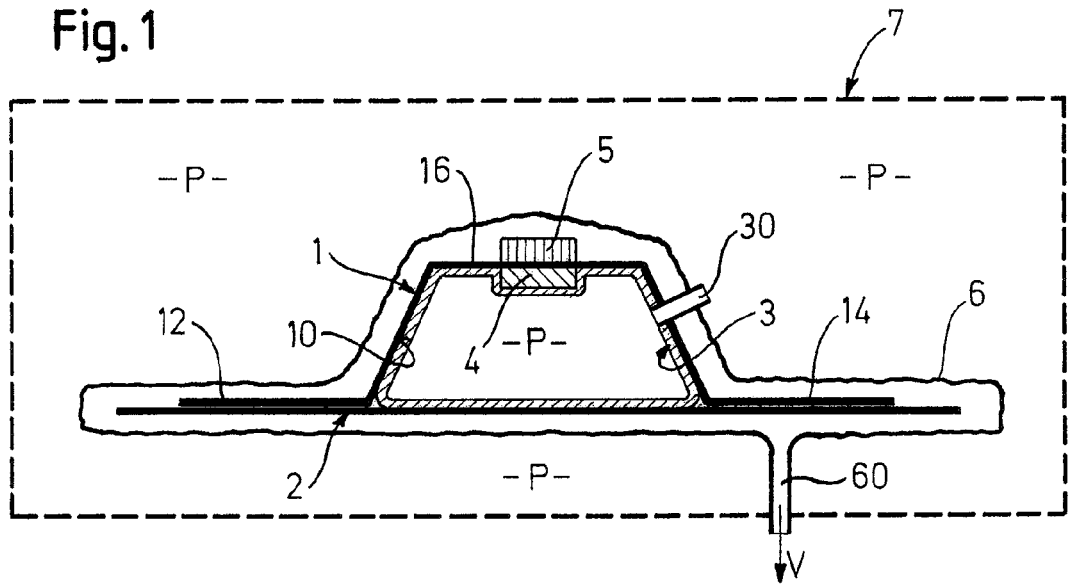
FIG. 1 is a cross-sectional view of a first embodiment of the arrangement of two component elements enclosing a hollow body according to the invention when implementing a process according to the invention.

FIG. 1 illustrates the arrangement of two component elements 1, 2, the first component element 1 being provided with an indentation 10, which has a trapezoidal cross-section. On the left and the right next to the indentation 10, the first component element 1 has base sections 12, 14 which extend parallel to the second component 2 situated underneath and are connected with the latter by means of an adhesive agent (not shown). In this manner, the indentation 10 of the first component element 1 is closed off at its open underside by means of the second component element 2, so that the first component element 1 and the second component element 2 form a hollow profile at this point.

In the interior of the indentation 10, a hollow body 3 is arranged which is constructed as a preform and whose cross-section corresponds essentially to the cross-section of the indentation, and thus to the formed hollow profile. The hollow body therefore also has a trapezoidal cross-section. If the second component also has an indentation at this point, the cross-section of the hollow body can be selected such that it engages in both indentations in a fitting manner.

In the upper area of the hollow body 3 (thus, on its side facing away from the second component element 2), a metal band 4 is worked into the hollow body 3, which metal band 4 rests against the interior side of a wall section 16 of the first component element 1. On the other side of this wall section 16, a permanent magnet 5 is provided which attracts the metal element 4 to the wall section 16 and thus positions and fixes the hollow body 3 in the interior of the indentation 10.

A fluid-tight covering 6, which surrounds the two joined component elements 1 and 2, is equipped with a vacuum connection 60 which is schematically illustrated in FIG. 1. A vacuum pump (not shown) sucks the air situated in the interior of the covering 6 out of the covering, as symbolized by the arrow V, so that the covering places itself on the exterior surfaces of the component formed of the first component element 1 and the second component element 2. In this case, air bubbles which may exist in the adhesive agent layer connecting the base sections 12, 14 of the first component element 1 with the second component element 2 are subjected to suction, so that an optimal flat mutual gluing-together of the two component elements is achieved in this area. The ambient pressure P present in the environment of the component elements 1, 2 covered by the covering 6 acts from the outside upon the covering 6 and thus upon the freshly laminated and not yet hardened component elements 1 and 2 and pressure these together. In this case, the vacuum in the interior of the covering also sucks out trapped air possibly contained in the laminate.

By way of a pressure fluid connection 30 penetrating the wall of the covering 6 in a fluid-tight manner, the interior of the hollow body 3 is in a fluidic connection, so that pressure compensation can take place between the interior of the hollow body 3 and the exterior environment outside the covering 6. The ambient pressure P exists in a pressure chamber oven 7 which is schematically illustrated in FIG. 1 and in which the two component elements 1 and 2 provided with the covering 6 had been placed. The ambient pressure P therefore also exists in the interior of the hollow body 3. This prevents the wall sections of the first component element 1 and of the second component element 2 forming the hollow profile from collapsing as a result of the ambient pressure P.

As a result of the trapezoidal preform development of the hollow body 3, which is subjected to excess pressure in comparison to the vacuum in the interior of the fluid-tight connection 6, while its corresponding wall areas are minimally stretched, the hollow body 3 can extend into the corners of the indentation 10 or of the hollow profile formed of the indentation 10 and the second component element 2, so that, also in these corner areas, the exterior ambient pressure P can act upon the laminated wall areas of the first component element as well as of the second component element and compresses these wall areas. Waving of the individual laminate layers in these wall areas, such as may occur in the prior art, can thereby be prevented.

Figure 2:
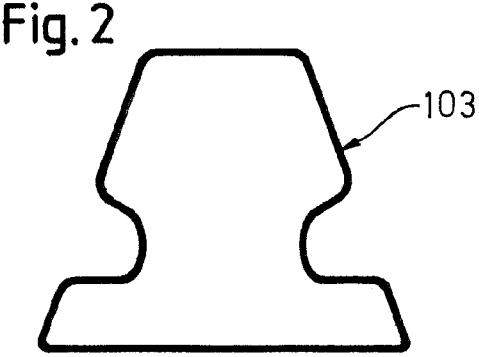
FIG. 2 is an alternative cross-sectional view of a hollow body according to the invention.
Figure 3:
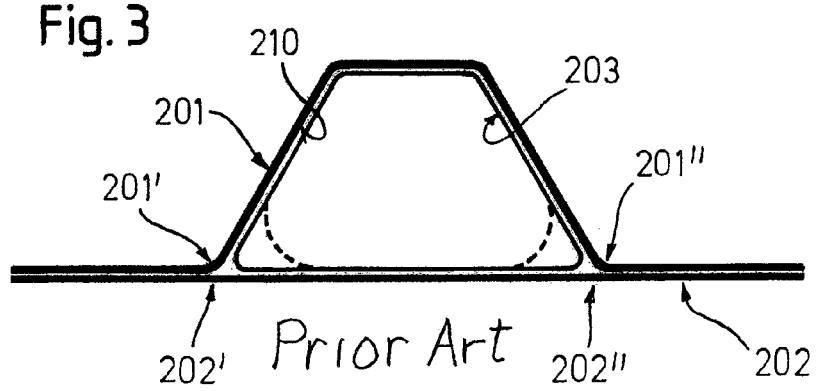
FIG. 3 is a view of two laminated components with an enclosed hollow body according to the prior art.

FIG. 2 illustrates an alternative further embodiment of a hollow body 103 which has the cross-section shape of the Greek letter "omega" with a closed base. This embodiment has the purpose of illustrating that a plurality of also more complicated shapes of cross-sections of the hollow profile to be formed of the first component element and the second component element can be implemented by the hollow body constructed as a preform according to the invention.

Reference symbols in the claims, the description and the drawings are used only for a better understanding of the invention and should not limit the scope of protection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS 1 first component element
2 second component element
3, 103 hollow body
4 metal element
5 magnet
6 covering
7 pressure chamber
10 indentation
12 base section
14 base section
16 wall section
30 pressure fluid connection
60 vacuum connection
201 first component element
201',202" area of 201
202 second component element
202",202" area of 202
210 indentation

What is claimed is:

1. A process for producing a component having at least one hollow profile from first and second laminated component elements, said process comprising:
    providing the first component element with an indentation therein;
    arranging a preformed hollow body in the indentation;
    applying an adhesive agent to a surface area of the first component element adjacent the indentation;
    placing the first component element together with the hollow body on the second component element such that the indentation with the preformed hollow body arranged therein faces the second component element, and the surface area provided with the adhesive agent comes in contact with the second component element;
    surrounding the first and second component elements with a non-rigid fluid-tight covering, with an interior of the hollow body being sealed off from the interior of the covering and being in fluid communication with ambient environment outside the covering;
    placing the surrounded covered component elements in a pressure chamber; and
    applying a vacuum to the interior of the covering;
    wherein arranging the preformed hollow body in the indentation includes securing the hollow body in the indentation;
    wherein the hollow body is provided, on its outer side, with a metal element or a magnet, and is secured in the indentation by way of a magnet or a metal element attached to an outer side of the first component element that interacts with the metal element or the magnet provided on the outer side of the hollow body; and
    wherein the preformed hollow body arranged in the indentation has a cross section corresponding to a cross section of the indentation and is extended into corners formed by the indentation and the second component element.

2. The process according to claim 1, wherein:
    the pressure chamber is part of a pressure chamber oven; and
    after or during the application of the vacuum to the interior of the covering, the component elements are heated.

3. The process according to claim 1, wherein the metal element is provided on the outer side of the hollow body, and the metal element provided on the outer side of the hollow body is an iron-containing metal band.

4. The process according to claim 1, wherein the preformed hollow body has exterior walls which are substantially rigid at least in sections.

5. The process according to claim 1, wherein:
    the first component element forms at least a section of a longitudinal frame of an aircraft fuselage construction; and
    the second component element forms at least a section of a skin of the aircraft fuselage construction.

6. The process according to claim 1, wherein applying the vacuum to the interior of the covering extends the hollow body, without overstretching, into the corners formed by the indentation and the second component element to permit pressure from the ambient environment to act on wall areas of said corners.

* * * * *